UNITED STATES PATENT OFFICE.

JOHANN BAMMANN AND MORITZ ULRICH, OF ELBERFELD, GERMANY, ASSIGNORS TO THE FARBENFABRIKEN, VORMALS FR. BAYER & CO., OF SAME PLACE.

BLUE TETRAZO DYE.

SPECIFICATION forming part of Letters Patent No. 498,873, dated June 6, 1893.

Application filed January 19, 1893. Serial No. 458,993. (Specimens.) Patented in England August 26, 1890, No. 13,443; in Austria-Hungary November 28, 1890, No. 35,494 and No. 58,417; in France December 6, 1890, No. 210,033, and in Italy April 27, 1891, XXV, 29,631, LVIII, 100.

*To all whom it may concern:*

Be it known that we, JOHANN BAMMANN and MORITZ ULRICH, doctors of philosophy, chemists, (assignors to the FARBENFABRIKEN, VORMALS FR. BAYER & CO., of Elberfeld,) subjects of the Emperor of Germany, residing at Elberfeld, Germany, have invented a new and useful Improvement in the Manufacture of Blue Tetrazo Dye-Stuffs, (for which the aforesaid FARBENFABRIKEN has already obtained Letters Patent in the following countries: England, No. 13,443, dated August 26, 1890; France, No. 210,033, dated December 6, 1890; Italy, XXV, No. 29,631, and LVIII, No. 100, dated April 27, 1891, and Austria-Hungary, No. 35,494 and No. 58,417, dated November 28, 1890,) of which the following is a specification.

Our invention relates to the production of a new blue mixed tetrazo coloring-matter by combining in equimolecular proportions a tetrazo ortho ditolyl salt either with amidonaphthol disulpho acid and alpha naphthol alpha monosulpho acid or inversely at first with alpha naphthol alpha monosulpho acid and then with amidonaphthol disulpho acid.

By amidonaphthol disulpho acid we understand that alpho amido alpha naphthol beta disulpho acid which we have described in a separate specification and which results by melting with caustic alkalies most practically at a temperature from about 180° to 190° centigrade the alphanaphthylamine trisulpho acid first prepared by Koch, viz: by nitrating the naphthalene trisulpho acid of Gürke and Rudolph and reducing the alphanitronaphthalene trisulpho acid thus formed. The resulting amidonaphthol disulpho acid usually termed 1:8—amidonaphthol beta disulpho acid is identical with the amidonaphthol disulpho H acid which has been afterward obtained by converting naphthalene 2:7—disulpho acid into its dinitro derivative, reducing the latter and heating the so formed diamidonaphthalene disulpho acid with diluted acids as mentioned in the specification forming part of Letters Patent to Meinhard Hoffmann, No. 464,135, dated December 1, 1891.

In carrying out our process practically we proceed as follows: A solution in water of 3.63 kilos, by weight, of the sodium salt of the 1:8-amidonaphtholbetadisulpho acid above specified is allowed to flow into a tetrazoditolyl solution obtained from 2.12 kilos, by weight, of orthotolidine or the corresponding quantity of an orthotolidine salt in hydrochloric solution by means of 1.4 kilos, by weight, of sodium nitrite. The resulting solution is kept moderately alkaline by adding, for instance, sodium carbonate or weakly acid by means of acetic acid. When after some hours the formation of the intermediate product is complete, common salt is added, in order to precipitate the thus formed product. The latter is filtered off and introduced into a watery solution of 2.46 kilos, by weight, of the sodium salt of alphanaphthol alphamonosulpho acid (1:4), taking care by adding, for instance, sodium carbonate that the solution remains alkaline during the whole operations. It is, however, not necessary previously to filter off the first formed intermediate product, but the above moderately alkaline or acid solution containing the above intermediate product resulting from equal molecular proportions of tetrazoditolyl and amidonaphtholdisulpho acid can directly be added to the alkaline solution of the sodium salt of alphanaphthol alpha monosulpho acid (1:4), taking care that the liquid remains alkaline during this operation. After twelve hours the mixture is heated for a short time at about 60° centigrade, in order to complete the reaction, and the complete dye-stuff is isolated in the usual manner, for instance, by salting out, filtering off, pressing and drying. The same coloring-matter is obtained in an analogous manner, if one molecular proportion of tetrazoortho ditolyl salt is first coupled with one molecular proportion of alphanaphthol alpha monosulpho acid (1:4) in acetic solution and the so formed intermediate product is then combined with one molecular proportion of the aforesaid amidonaphtholdisulpho acid, effecting the latter process most practically in moderately alkaline solution. Of course, in place of the sodium salts of amidonaphtholdisulpho acid and alpha naphthol alphamonosulpho acid (1:4) also the corresponding quantities of other alkaline salts of these two acids or the corresponding quantities of these two acids in free state can be employed.

Our new dye-stuff having the formula:

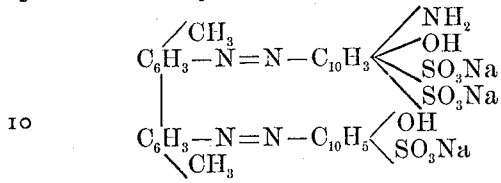

forms after drying and pulverizing a grayish-black powder soluble in water with bluish-red color, the latter being somewhat bluer than is the color with which the analogous dye formed from benzidine dissolves in water. It is somewhat soluble in alcohol with bluish-red color and is dissolved by ammonia and soda-lye with bluish-red color. In sodium carbonate it dissolves, especially on heating, with bluish-red color. Out of its solutions in sodium carbonate and soda-lye brownish-flakes gradually are separated. It is insoluble in diluted hydrochloric or sulfuric acid. On adding ammonia to its watery solutions the color becomes somewhat dull, and after some time bluish-violet flakes are separated, while an addition of sodium carbonate or soda-lye renders the color at first a little redder, the liquid becoming gradually dull and brownish-red or bluish-red flakes being separated after some time. When its watery solutions are mixed with diluted hydrochloric or sulfuric acid, the liquid assumes at first a clearer color, while after standing for some time dark bluish-red or brownish-red flakes are separated. By concentrated sulfuric acid it is dissolved with greenish-blue color, which turns into bluish-violet on adding ice water to the sulfuric acid solution and after some time dark blue flakes being separated. It dyes unmordanted cotton blue.

When the fiber dyed with our new product is treated in moderately acid solution of sodium nitrite and subsequently in a weakly alkaline bath of beta naphthol, from bluish-gray to black shades result.

Our new dye-stuff differs by its composition from the three products which we have described in three separate specifications Serial Nos. 459,086, 458,991 and 458,992, and of which the one results by the combination of equimolecular proportions of tetrazo diphenyl salt, 1:8—amidonaphthol-betadisulpho acid and alpha-naphthol-alpha-monosulpho acid (1:4), while the other is obtained by coupling equal molecular proportions of a tetrazo ortho ditolyl salt, 1:8—amidonaphthol-betadisulpho acid and 2:6—dihydroxynaphthalene and the third results by the combination of equimolecular proportions of a tetrazo diphenyl salt, 1:8—amidonaphthol betadisulpho acid and alpha naphthylamine. It likewise is different by its composition from the two dyestuffs described in our applications filed December 18, 1891, Serial Nos. 415,515 and 415,516, and resulting from the combination of one molecular proportion of tetrazodiphenyl salt or tetrazo ortho ditolyl salt with two molecular proportions of 1:8—amidonaphthol beta disulpho acid.

Having thus described the nature of this invention and in what manner the same is to be carried out, we declare that what we claim as new, and desire to secure by Letters Patent, is—

1. The process for producing a new blue dye-stuff by combining equimolecular proportions of a tetrazo orthoditolyl salt with 1:8—amidonaphthol beta-disulpho acid and alpha-naphthol alpha monosulpho acid or equivalent process.

2. As a new product the dye-stuff having the formula:

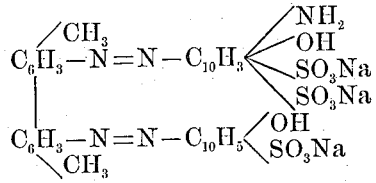

forming a grayish black powder soluble in water and slightly soluble in alcohol, with bluish red color, soluble in ammonia in soda lye and in sodium carbonate, especially on heating with bluish red color, and from its solution in soda lye and sodium carbonate brownish flakes separate gradually, soluble in concentrated sulphuric acid with greenish blue color, which, on dilution with ice water changes to blue violet, and separates after some time dark blue flakes, insoluble in dilute hydrochloric or sulphuric acid, and dyeing unmordanted cotton blue, and having the qualities substantially as specified.

JOHANN BAMMANN.
MORITZ ULRICH.

Witnesses:
WM. ESSENWEIN,
RUDOLPH FRICKE.